(12) United States Patent
Wang et al.

(10) Patent No.: US 11,489,345 B2
(45) Date of Patent: Nov. 1, 2022

(54) CONTROLLERS, CHARGING CABLES, AND SYSTEMS AND METHODS FOR IDENTIFYING TYPES OF CHARGING CABLES

(71) Applicant: O2Micro Inc., Santa Clara, CA (US)

(72) Inventors: Mingfeng Wang, Shanghai (CN); Xinsheng Peng, Wuhan (CN)

(73) Assignee: O2Micro Inc., Santa Clara, CA (US)

( * ) Notice: Subject to any disclaimer, the term of this patent is extended or adjusted under 35 U.S.C. 154(b) by 224 days.

(21) Appl. No.: 17/023,118

(22) Filed: Sep. 16, 2020

(65) Prior Publication Data

US 2021/0099000 A1    Apr. 1, 2021

(51) Int. Cl.
*H02J 7/00*    (2006.01)

(52) U.S. Cl.
CPC ........ *H02J 7/00045* (2020.01); *H02J 7/0045* (2013.01)

(58) Field of Classification Search
CPC ..... H02J 7/00045; H02J 7/045; H02J 7/00041
See application file for complete search history.

(56) References Cited

U.S. PATENT DOCUMENTS

| | | | | |
|---|---|---|---|---|
| 8,749,221 B2* | 6/2014 | Wada | ................. | G06F 13/4081 324/71.1 |
| 9,223,727 B2* | 12/2015 | Wada | ................. | H04N 7/00 |
| 10,310,576 B2* | 6/2019 | Ueki | ................. | G06F 21/44 |
| 2015/0340898 A1* | 11/2015 | Schwartz | ............. | G06F 1/3212 320/103 |
| 2020/0403433 A1* | 12/2020 | Chung | ............... | H02J 7/00045 |

* cited by examiner

*Primary Examiner* — Richard V Muralidar

(57) ABSTRACT

A controller includes: a transmission terminal, operable for transmitting a clock signal transmitted by an external device, and also operable for receiving electric power supplied by a power source to enable the controller to generate a voltage signal; a processing unit, coupled to the transmission terminal, operable for performing a logical operation on the voltage signal and generating an indication signal based on the clock signal, the indication signal includes a rectangular wave signal having a first level and a second level; and a feedback unit, coupled to the processing unit, operable for providing a configuration signal indicating a type of the charging cable when the indication signal is changed from a second level to a first level. The transmission terminal transmits the configuration signal to the external device, to enable the external device to identify the type of the charging cable based on the configuration signal.

26 Claims, 7 Drawing Sheets

CONTROLLERS, CHARGING CABLES, AND SYSTEMS AND METHODS FOR IDENTIFYING TYPES OF CHARGING CABLES

RELATED APPLICATION

This application claims priority to Chinese Patent Application No. 201910941613.8, titled "Controllers, Charging Cables, Systems and Methods for Identifying Charging Cables," filed on Sep. 30, 2019, with the National Intellectual Property Administration of the People's Republic of China (CNIPA).

BACKGROUND

Electronic devices are widely used in people's daily lives. In general, rechargeable batteries are used to supply electric power for the electronic devices. The functions supported by the electronic devices rapidly consume the battery capacity of the rechargeable batteries. Because the battery capacity is limited, it is necessary to charge the batteries frequently. To shorten each charging operation, a method for charging the batteries with a large amount of current has been developed. In this method, the resistance of the charging cables must be low to ensure safety. If the proper charging cables are not used, the charging cables and/or the electronic device may be damaged.

SUMMARY

Embodiments in accordance with the present invention pertain to controllers, charging cables, and systems and methods for identifying types of charging cables.

In embodiments, a controller includes: a transmission terminal, operable for transmitting a clock signal transmitted by an external device; and also operable for receiving electric power supplied by a power source to enable the controller to generate a voltage signal; a processing unit, coupled to the transmission terminal, operable for performing a logical operation on the voltage signal and generating an indication signal based on the clock signal, where the indication signal includes a rectangular wave signal having a first level and a second level; and a feedback unit, coupled to the processing unit, operable for providing a configuration signal indicating a type of the charging cable when the indication signal is changed from a second level to a first level; where the transmission terminal is operable for transmitting the configuration signal to the external device, to enable the external device to identify the type of the charging cable based on the configuration signal.

In embodiments, a charging cable includes: a controller operable for two-way communication with an external device to enable the external device to identify a type of the charging cable; where the controller includes: a transmission terminal, coupled to the external device, operable for transmitting a clock signal transmitted by the external device, and also operable for receiving electric power supplied by a power source to enable the controller to generate a voltage signal; a processing unit, coupled to the transmission terminal, operable for performing a logical operation on the voltage signal and for generating an indication signal based on the clock signal, where the indication signal includes a rectangular wave signal having a first level and a second level; and a feedback unit, coupled to the processing unit, operable for providing a configuration signal indicating the type of the charging cable when the indication signal is changed from the second level to the first level; where the transmission terminal is operable for transmitting the configuration signal to the external device, to enable the external device to identify the type of the charging cable based on the configuration signal.

In embodiments, a system for identifying a type of a charging cable includes: a charging cable, configured to generate a configuration signal indicating a type of the charging cable; an external device, operable for two-way communication with the charging cable, for identifying a type of the charging cable based on the configuration signal, and for determining a charging mode of a terminal based on the type of the charging cable; where the charging cable includes: a controller, coupled to the external device, operable for two-way communication with the external device to enable the external device to identify the type of the charging cable; where the controller includes: a transmission terminal, coupled to the external device, operable for transmitting a clock signal transmitted by the external device, and also operable for receiving electric power supplied by a power source to enable the controller to generate a voltage signal; a processing unit, coupled to the transmission terminal, operable for performing a logical operation on the voltage signal and for generating an indication signal based on the clock signal, where the indication signal includes a rectangular wave signal having a first level and a second level; and a feedback unit, coupled to the processing unit, operable for providing a configuration signal indicating the type of the charging cable when the indication signal is changed from the second level to the first level; where the transmission terminal is operable for transmitting the configuration signal to the external device, to enable the external device to identify the type of the charging cable based on the configuration signal.

In embodiments, a method for identifying a type of a charging cable includes: receiving, using a controller, a clock signal transmitted by an external device; performing, using a processing unit in the controller, a logical operation on a voltage signal and generating an indication signal based on the clock signal, where the indication signal includes a rectangular wave signal having a first level and a second level, and where the voltage signal is generated by the controller; providing, using a feedback unit in the controller, a configuration signal indicating the type of the charging cable, to enable the external device to identify the type of the charging cable based on the configuration signal, when the indication signal is changed from the second level to the first level.

BRIEF DESCRIPTION OF THE DRAWINGS

Features and advantages of embodiments of the present invention will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "transmitting," "providing," "sending," "identifying," "receiving," "changing," "mirroring," "outputting," or the like, refer to actions and processes of a computing system or similar electronic computing device or processor. A computing system or similar electronic computing device manipulates and transforms data represented as physical (electronic) quantities within the computing system memories, registers or other such information storage, transmission or display devices.

Figure 1:
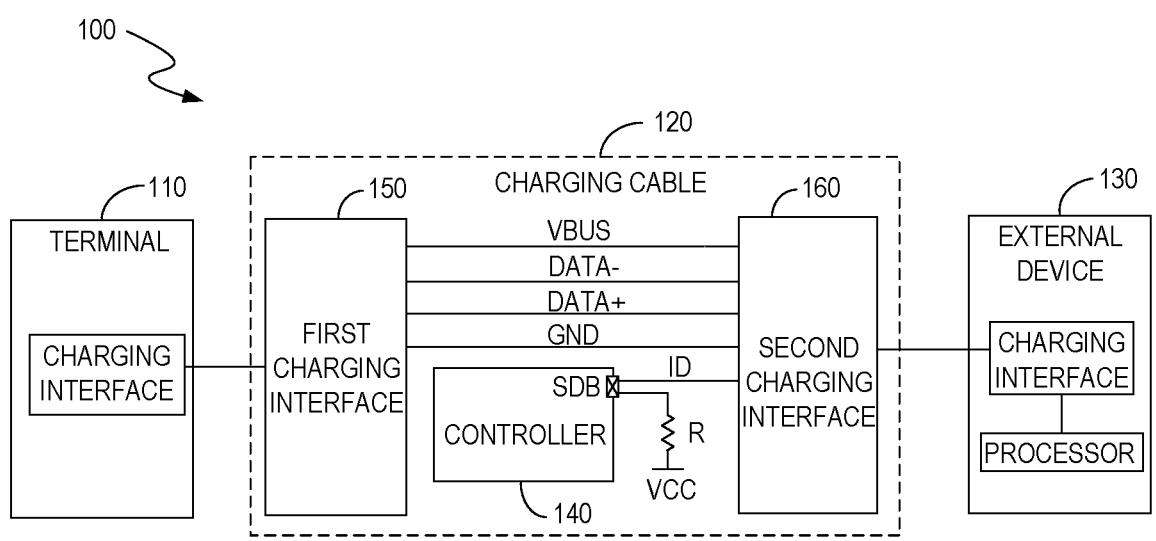
FIG. 1 shows a block diagram illustrating a system for identifying a type of a charging cable, in accordance with embodiments of the present invention.

FIG. 1 shows a block diagram illustrating a system 100 for identifying a type of a charging cable 120, in accordance with embodiments of the present invention. The system 100 includes the charging cable 120 and an external device 130. The external device 130 includes but is not limited to a power adapter and a laptop computer, which include a processor. The charging cable 120 includes a controller 140. The controller 140 is configured to generate a configuration signal indicating the type of the charging cable 120. The controller 140 communicates with the external device 130 through a second charging interface 160 of the charging cable 120, to enable the external device 130 to identify the type of the charging cable 120 based on the configuration signal. The external device 130 is also connected to a terminal 110 via the charging cable 120. The external device 130 selects a charging mode according to the type of the charging cable 120, and charges the terminal 110 via the charging cable 120. The terminal 110 includes, but is not limited to, a smart-phone, a tablet, a palmtop computer, a camera, an electric toothbrush, and an electric shaver.

In an embodiment, according to an internal resistance of the charging cable 120, the type of the charging cable 120 can be a first type, that supports a fast charging mode, or a second type, that supports an ordinary charging mode. The charging current in the fast charging mode is higher than that in the ordinary charging mode, and/or the charging voltage in the fast charging mode is higher than that in the ordinary charging mode. For example, if the charging cable 120 has less internal resistance, then it does not generate a significant amount of heat when it transmits a large amount of current and thus supports the fast charging mode. Otherwise, if the charging cable 120 has more internal resistance, then it supports the ordinary charging mode. When the charging cable 120 is manufactured, one of the types of the charging cable 120 is written into the controller 140 as a configuration signal. For example, when the charging cable 120 is the first type, the configuration signal is written as a code "0101"; when the charging cable 120 is the second type, the configuration signal is written as a code "1110". The external device 130 identifies the type of the charging cable 120 through the configuration signal, to select the corresponding charging mode supported by the charging cable 120.

In an embodiment, the charging cable 120 includes a voltage bus VBUS, a ground line GND, an identification line ID, a positive data line DATA+, a negative data line DATA−, a first charging interface 150, and the second charging interface 160. The first charging interface 150 is coupled to the voltage bus VBUS, the ground line GND, the positive data line DATA+, and the negative data line DATA−, respectively. The charging cable 120 is connected to the terminal 110 via the first charging interface 150. The second charging interface 160 is coupled to the voltage bus VBUS, the ground line GND, the identification line ID, the positive data line DATA+, and the negative data line DATA−, respectively. The charging cable 120 is connected to the external device 130 via the second charging interface 160. The positive data line DATA+ and the negative data line DATA− are operable for transmitting data information (e.g., a charging protocol) to realize two-way communication between the terminal 110 and the external device 130, thus charging the terminal 110 with the appropriate charging parameters and/or charging algorithm. The voltage bus VBUS and the ground line GND are operable for transmitting electric power from the external device 130 to the terminal 110. The indication line ID is coupled between the external device 130 and the controller 140, and is operable for transmitting data information between the external device 130 and the controller 140, to enable the external device 130 to identify a type of the charging cable 120. The first charging interface 150 can be a Micro USB (Universal Serial Bus) interface, a type C interface, 30-pin interface, a Lightning interface, or the like. The second charging interface 160 can be a USB interface. In an embodiment, the charging cable 120 is detachable from the external device 130. In another embodiment, the charging cable 120 is integrated with the external device 130.

In an embodiment, the configuration signal indicating the type of the charging cable 120 is stored in the controller 140. The controller 140 includes a transmission terminal SDB. The transmission terminal SDB is connected to the external device 130 via the identification line ID. The transmission terminal SDB receives a clock signal CLK transmitted by the external device 130 through the identification line ID, and transmits the clock signal CLK to the controller 140. The transmission terminal SDB transmits the configuration signal from the controller 140 to the external device 130 through the identification line ID, to enable the external device 130 to identify the type of the charging cable 120. Thus, the controller 140 can realize two-way communication with the external device 130 using only one transmission terminal SDB. This reduces the number of peripheral devices, the area of the controller 140, and costs. In addition, the transmission terminal SDB is connected to a power source VCC through a pull-up resistor R. The power source VCC supplies electric power to the controller 140 to enable the controller 140 to generate a voltage signal VDD. In an embodiment, the voltage supplied by the power source VCC is 3.3V.

In an embodiment, the configuration signal includes a first signal and a second signal. The external device 130 compares the first signal with the second signal to identify a type of the charging cable 120. For example, the first signal is represented by "0101" and the second signal is represented by "1010". The first signal "0101" and the second signal "1010" stored in the controller 140 are provided to the external device 130 through the identification line ID. After the first signal "0101" and the second signal "1010" are received, the external device 130 compares the first value in the first signal "0101" with the fourth value in the second signal "1010", compares the second value in the first signal "0101" with the third value in the second signal "1010", or the like. If each value in the first signal is the same as the corresponding value of the second signal, then the external device 130 identifies that the charging cable 120 is the first type. If any value in the first signal is different from the corresponding value in the second signal, then the external device 130 identifies that the charging cable 120 is the second type. In other embodiments, the mode for comparing the first signal and the second signal may be specified by design and/or set by a user.

In an embodiment, the configuration signal is the first signal. The external device 130 compares the first signal with a preset signal to identify the type of the charging cable 120. The preset signal is stored in the external device 130. For example, the first signal "0101" is sent to the external device 130 via the identification line ID by the controller 140. After the first signal "0101" is received, the external device 130 compares the first signal with the preset signal in the order from left to right. If the preset signal also is "0101", the type of the charging cable 120 is determined to be the first type. If the preset signal is not "0101", the type of the charging cable 120 is determined to be the second type. In other embodiments, the modes for comparing the configuration signal and the preset signal may be specified by design and/or set by a user.

When the charging cable 120 is the first type, the external device 130 charges the terminal 110 in the fast charging mode. In an embodiment, when the charging cable 120 is the first type, the external device 130 converts 220V alternating voltage to 5V voltage, and the 5V voltage is then transmitted to the terminal 110 through the voltage bus VBUS, thereby charging the terminal 110.

When the charging cable 120 is the second type, the external device 130 charges the terminal 110 in the ordinary charging mode. In an embodiment, when the charging cable 120 is the second type, the external device 130 converts 220V alternating voltage to 2V voltage, and the 2V voltage is then transmitted to the terminal 110 through the voltage bus VBUS, thereby charging the terminal 110. In other embodiments, when the charging cable 120 is the second type, the external device 130 transmits an alert signal to the user through the positive data line DATA+ and the negative data line DATA−. Alternatively, the external device 130 controls its own signal lights to alert the user.

In addition, the external device 130 communicates with the terminal 110 via the positive data line DATA+ and the negative data line DATA−, to select one of the charging modes supported by the terminal 110. The external device 130 can select one of the charging modes to charge the terminal 110 safely according to a charging mode supported by the terminal 110 and a charging mode supported by the charging cable 120. For example, if the terminal 110 supports the fast charging mode and the charging cable 120 supports the ordinary charging mode, then the ordinary charging mode is selected by the external device 130 to ensure the safety of the system 100.

Figure 2:
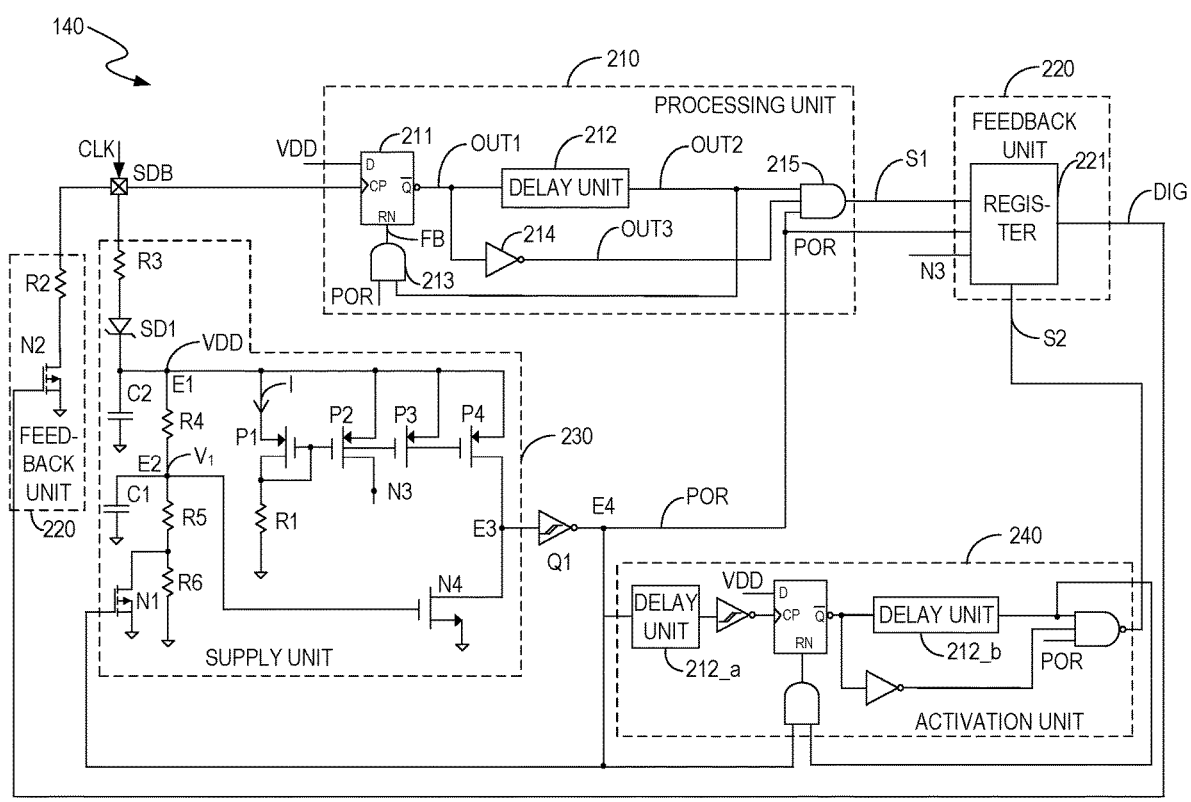
FIG. 2 shows a circuit diagram illustrating a controller, in accordance with embodiments of the present invention.

FIG. 2 shows a circuit diagram illustrating the controller 140, in accordance with embodiments of the present invention. The controller 140 includes the transmission terminal SDB. Specifically, the transmission terminal SDB is coupled to the power source VCC (in FIG. 1), and receives electric power supplied by the power source VCC to enable the controller 140 to generate the voltage signal VDD. The voltage signal VDD is initially at a high level (described below). The transmission terminal SDB is coupled to the external device 130 and transmits the clock signal CLK generated by the external device 130.

The controller 140 includes a processing unit 210. The processing unit 210 is coupled to the transmission terminal SDB. In response to the clock signal CLK, the processing unit 210 performs a logical operation on the voltage signal VDD and generates an indication signal S1. The indication signal S1 includes a rectangular wave signal having a first level (e.g., a high level) and a second level (e.g., a low level). Specifically, the processing unit 210 includes a first logic circuit 211, a delay unit 212, a second logic circuit 213, a third logic circuit 214, and a fourth logic circuit 215.

The first logic circuit 211 is coupled to the transmission terminal SDB and generates a first output signal OUT1. Specifically, when the clock signal CLK is changed from a first level (e.g., a high level) to a second level (e.g., a low level), the first logic circuit 211 changes the first output signal OUT1 from a first level (e.g., a high level) to a second level (e.g., a low level). In an embodiment, an input terminal D of the first logic circuit 211 receives the voltage signal VDD, an input terminal CP receives the clock signal CLK, and the output terminal Q of the first logic circuit 211 outputs the first output signal OUT1. When the clock signal CLK is changed from a high level to a low level, the first logic circuit 211 does not transmit the voltage signal VDD and generates the first output signal OUT1 in a low-level state. In the embodiment, the first logic circuit 211 is a D flip-flop.

The delay unit 212 is coupled to the first logic circuit 211, and generates a second output signal OUT2 according to the first output signal OUT1. Specifically, the delay unit 212 delays, by a preset time period t, transmitting a second level (e.g., a low level) in the first output signal OUT1 to generate a second output signal OUT2. In an embodiment, the delay unit 212 receives a low level in the first output signal OUT1, does not transmit a low level in the first output signal OUT1, and generates the second output signal OUT2 in a high-level state. At the end of the preset time period t, the delay unit 212 transmits a low level in the first output signal OUT1 and generates the second output signal OUT2 in a low-level state. In the embodiment, the delay unit 212 includes a first MOS (metal oxide semiconductor) transistor P21, a second MOS transistor P24, a third MOS transistor N21, a capacitor C3, and an output unit 310. The details are described in the discussion of FIG. 3.

The second logic circuit 213 is coupled to the delay unit 212, and generates a feedback signal FB according to the second output signal OUT2. Specifically, when the second output signal OUT2 is changed from a first level (e.g., a high level) to a second level (e.g., a low level), the second logic circuit 213 changes the feedback signal FB from a first level (e.g., a high level) to a second level (e.g., a low level). In an embodiment, the second logic circuit 213 performs an AND operation on the second output signal OUT2 and a reference signal POR, and generates the feedback signal FB. After the controller 140 is powered on, the reference signal POR is at a high level (described below). If the second output signal OUT2 is at a low level, then the feedback signal FB is at a low level. If the second output signal OUT2 is at a high level, then the feedback signal FB is at a high level. Therefore, the second output signal OUT2 is changed from a high level to a low level, and the second logic circuit 213 changes the feedback signal FB from a high level to a low level. A feedback terminal RN of the first logic circuit 211 receives the feedback signal FB in a low-level state, and the first logic circuit 211 changes the first output signal OUT1 from a low level to a high level. At this time, a low level in the first output signal OUT1 lasts for the preset time period t. In this embodiment, the second logic circuit 213 is an AND gate.

The third logic circuit 214 is coupled to the first logic circuit 211, and generates a third output signal OUT3 according to the first output signal OUT1. In an embodiment, the third logic circuit 214 performs a NOT operation on the first output signal OUT1 and generates the third output signal OUT3. That is, the third logic circuit 214 inverts the first output signal OUT1 and generates the third output signal OUT3. In this embodiment, the third logic circuit 214 is a NOT gate.

The fourth logic circuit 215 is coupled to the delay unit 212, a supply unit 230 (described below), and the third logic circuit 214. The fourth logic circuit 215 performs an AND operation on the second output signal OUT2 and the third output signal OUT3, and generates the indication signal S1. In an embodiment, in the preset time period t, the second output signal OUT2, the third output signal OUT3, and the reference signal POR are all at a high level. After the AND operation is performed on the second output signal OUT2, the third output signal OUT3, and the reference signal POR, the fourth logic circuit 215 generates the indication signal S1 in a high-level state during the preset time period t. As described above, when the clock signal CLK is changed from a high level to a low level, the indication signal S1 is at a high level and the high-level state lasts for the preset time period t. At the end of the preset time period t and before the clock signal CLK is again changed from a high level to a low level, the indication signal S1 is at a low level. The indication signal S1 is a rectangular wave signal with high and low levels. At the same time, each time period that the indication signal S1 remains at the high level is equal, and each time period that the indication signal S1 remains at the low level is equal. These enable the controller 140 to provide the configuration signal more accurately. In this embodiment, the fourth logic circuit 215 is an AND gate.

The controller 140 includes a feedback unit 220. The feedback unit 220 is coupled to the processing unit 210. When the indication signal S1 is changed from a second level (e.g., a low level) to a first level (e.g., a high level), the feedback unit 220 sends the configuration signal indicating the type of the charging cable 120. In an embodiment, the feedback unit 220 includes a register 221, a resistor R2, and an N-MOS transistor N2. A gate of the N-MOS transistor N2 is connected to the register 221, a drain is connected to the transmission terminal SDB via the resistor R2, and a source is connected to a ground. When the indication signal S1 is changed from a low level to a high level, the register 221 generates a digital signal DIG corresponding to the configuration signal. The configuration signal is stored in the register 221. The N-MOS transistor N2 is turned on or turned off according to the digital signal DIG, to pull down or pull up a voltage at the transmission terminal SDB, thereby sending the configuration signal. For example, when the configuration signal is "10", the digital signal DIG generated by the register 221 is "01". When a first high level occurs in the indication signal S1, the register 221 transmits a low level "0" in the digital signal DIG "01", the N-MOS transistor N2 is turned off, and the voltage at the transmission terminal SDB is at a high level "1"; that is, the high level "1" is sent to the external device 130. When a second high level occurs in the indication signal S1, the register 221 transmits a high level "1" in the digital signal DIG "01", the N-MOS transistor N2 is turned on, and the voltage at the transmission terminal SDB is at a low level "0"; that is, the low level "0" is sent to the external device 130. Therefore, the configuration signal "10" is sent to the external device 130.

Continuing with reference to FIG. 2, the controller 140 includes the supply unit 230. The supply unit 230 is coupled to the transmission terminal SDB. When the controller 140 is powered on, the voltage at the transmission terminal SDB is pulled up to a high level. A capacitor C2 is charged through a resistor R3 and a Schottky diode SD1, and the voltage signal VDD is generated at a node E1, which supplies electric power for the controller 140. After the controller 140 is powered on, the voltage signal VDD is at a high level and the voltage value of the voltage signal VDD is $V_{total}$. After being divided by the resistors R4, R5, and R6, the voltage signal VDD generates a voltage $V_1$ at a node E2, and the voltage $V_1$ is supplied to a gate of an N-MOS transistor N4. $V_1 = V_{total} \times (R_5 + R_6)/(R_4 + R_5 + R_6)$, where $R_4$ represents the resistance value of the resistor R4, $R_5$ represents the resistance value of the resistor R5, and $R_6$ represents the resistance value of the resistor R6. The voltage signal VDD generates a bias current $I = (V_{total} - V_{gs})/R_1$ through a P-MOS transistor P1 and a resistor R1, where $V_{gs}$ represents a voltage difference between a gate and a source of the P-MOS transistor P1, and $R_1$ represents the resistance value of the resistor R1. A current mirror (e.g., including the P-MOS transistor P1, a P-MOS transistor P2, a P-MOS transistor P3, and a P-MOS transistor P4) mirrors the bias current I and supplies a bias current for other circuits in the controller 140. When the controller 140 is powered on, the voltage value $V_{total}$ of the voltage signal VDD increases from zero. Therefore, the voltage $V_1$ is less than the voltage $V_{gs}$ (it is assumed in the present invention that the voltage difference between the gate and the source of all the P-MOS transistors is equal), the N-MOS transistor N4 is turned off, and a voltage at a node E3 is at a high level. The high level at the node E3 is inverted to a low level by an inverter Q1. That is, a voltage at a node E4 is at a low level. At this time, components (an activation unit 240 and the register 221) in the controller 140 are still in a non-enabled or inactive state. When the voltage $V_1$ is not less than the voltage $V_{gs}$, the N-MOS transistor N4 is turned on and the voltage at the node E3 is pulled down. That is, the voltage at the node E3 becomes a low level. The low level at the node E3 is inverted to a high level by the inverter Q1. That is, the voltage at the node E4 becomes the high level. The reference signal POR at a high-level state is generated at the node E4. Components (e.g., the activation unit 240) in the controller 140 are then in an enabled or activated state.

The controller 140 includes the activation unit 240. The activation unit 240 is coupled between the supply unit 230 and the feedback unit 220. When the controller 140 is powered on, the activation unit 240 receives the reference signal POR in a high-level state and is activated. After a preset time interval, the activation unit 240 transmits a start signal S2 to the register 221 to enable/activate the register 221. That is, at the end of the preset time interval, the voltage value $V_{total}$ of the voltage signal VDD has increased to the start voltage value $V_{START}$. At that time, the activation unit 240 transmits a start signal S2, and the register 221 is enabled/activated according to the start signal S2. The preset time interval is determined by a delay unit 212_a and a delay unit 212_b. The delay unit 212_a and the delay cell 212_b are described with reference to the delay unit 212 in FIG. 3 and FIG. 4. After the controller 140 is powered on, both the voltage signal VDD and the reference signal POR are at a high level.

Figure 3:
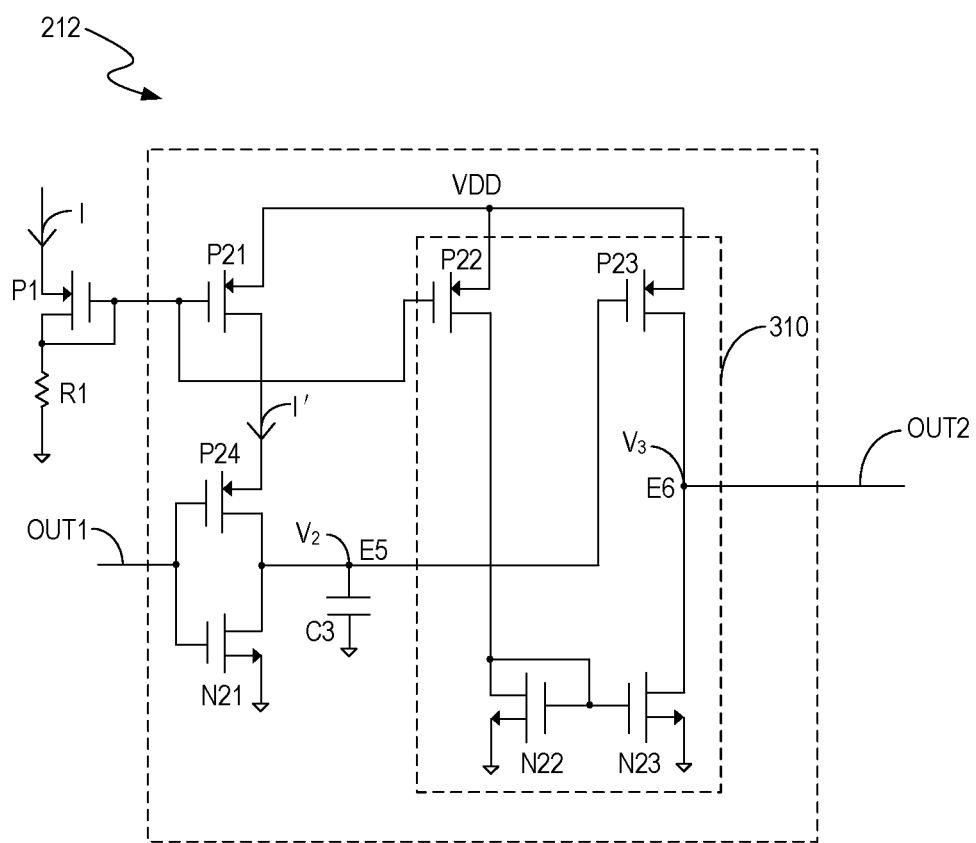
FIG. 3 shows a circuit diagram illustrating a delay unit, in accordance with embodiments of the present invention.

FIG. 3 shows a circuit diagram illustrating the delay unit 212, in accordance with embodiments of the present invention. The delay unit 212 includes a first MOS transistor P21. The first MOS transistor P21 is coupled to the supply unit 230. The first MOS transistor P21 mirrors the bias current I generated by the supply unit 230 and generates a bias current I'. In an embodiment, a gate of the first MOS transistor P21 is connected to the gate of the P-MOS transistor P1, a drain of the first MOS transistor P21 is connected to a source of a second MOS transistor P24, and a source of the first MOS transistor P21 is connected to the voltage signal VDD. The first MOS transistor P21 mirrors the bias current I and generates the bias current I'. The bias current I' flows from the first MOS transistor P21 to the second MOS transistor P24. In this embodiment, the first MOS transistor P21 is a P-MOS transistor.

The second MOS transistor P24 is coupled to the first MOS transistor P21 and the first logic circuit 211. Specifically, a gate of the second MOS transistor P24 is connected to the output terminal $\overline{Q}$ of the first logic circuit 211 to receive the first output signal OUT1, the source of the second MOS transistor P24 is connected to the drain of the first MOS transistor P21, and a drain of the second MOS transistor P24 is connected to a capacitor C3. When the first output signal OUT1 is at a second level (e.g., a low level), the second MOS transistor P24 is turned on to enable the bias current I' to flow to the second MOS transistor P24. In this embodiment, the second MOS transistor P24 is a P-MOS transistor.

The third MOS transistor N21 is coupled to the first logic circuit 211. Specifically, a gate of the third MOS transistor N21 is connected to the output terminal $\overline{Q}$ of the first logic circuit 211 to receive the first output signal OUT1, a source of the third MOS transistor N21 is connected to a ground, and a drain of the third MOS transistor N21 is connected to the capacitor C3. When the first output signal OUT1 is at a first level (e.g., a high level), the third MOS transistor N21 is turned on. In this embodiment, the third MOS transistor N21 is an N-MOS transistor.

The capacitor C3 is coupled to the second MOS transistor P24 and the third MOS transistor N21. When the second MOS transistor P24 is turned on and the third MOS transistor N21 is turned off, the capacitor C3 is charged. When the second MOS transistor P24 is turned off and the third MOS transistor N21 is turned on, the capacitor C3 is discharged. In an embodiment, when the second MOS transistor P24 is turned on and the third MOS transistor N21 is turned off, then the bias current I' flows from the second MOS transistor P24 to a node E5 and the capacitor C3, and the capacitor C3 is charged. At that time, the voltage $V_2$ at the node E5 increases from a low level (an initial voltage value $V_{IN}$, e.g., 0V) to a high level. When the second MOS transistor P24 is turned off and the third MOS transistor N21 is turned on, then the capacitor C3 is discharged, and the voltage $V_2$ at the node E5 decreases rapidly from a high level to a low level (to the initial voltage value $V_{IN}$, e.g., 0V).

The output unit 310 is coupled between the capacitor C3 and the fourth logic circuit 215. The output unit 310 outputs the second output signal OUT2 according to the voltage at the capacitor C3. In an embodiment, the output unit 310 includes a P-MOS transistor P22, a P-MOS transistor P23, an N-MOS transistor N22, and an N-MOS transistor N23. When the voltage at the capacitor C3 (the voltage $V_2$ at the node E5) is less than the preset voltage value $V_{SET}$, then the P-MOS transistor P23 is turned on and the voltage $V_3$ at a node E6 is pulled up; that is, the voltage $V_3$ is at a high level, and the second output signal OUT2 output by the output unit 310 is at a high level. When the voltage $V_2$ at the node E5 is not less than a preset voltage value $V_{SET}$, the P-MOS transistor P23 is turned off and the voltage $V_3$ at the node E6 is pulled down; that is, the voltage $V_3$ is at a low level, and the second output signal OUT2 output by the output unit 310 is at a low level.

Figure 4:
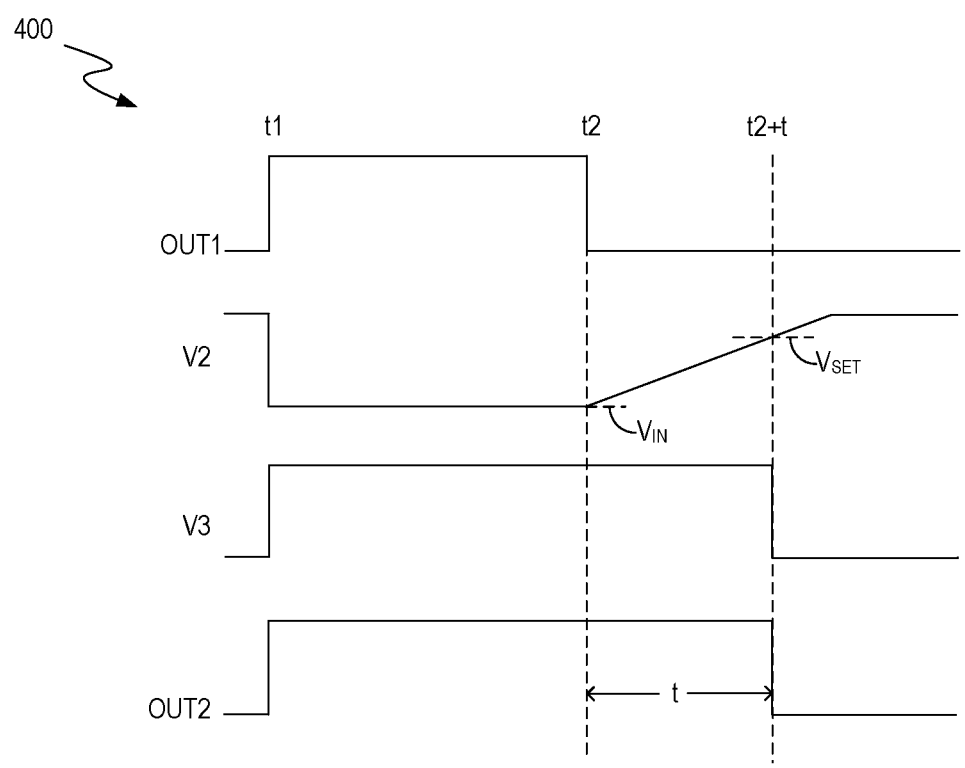
FIG. 4 shows a diagram illustrating operation of a delay unit, in accordance with embodiments of the present invention.

FIG. 4 shows a diagram illustrating operation of the delay unit 212, in accordance with embodiments of the present invention. FIG. 4 is described in conjunction with FIG. 3. At time t1, the first output signal OUT1 is at a high level, the N-MOS transistor N21 is turned on, the P-MOS transistor P24 is turned off, and the capacitor C3 is discharged. The voltage $V_2$ (a voltage at the capacitor C3) at the node E5 decreases from a high level to a low level (to the initial voltage $V_{IN}$, e.g., 0V). Because the voltage $V_2$ is less than the preset voltage $V_{SET}$ (described below), the P-MOS transistor P23 in the output unit 310 is turned on and the voltage $V_3$ at the node E6 is pulled up; that is, the voltage $V_3$ increases to a high level. Therefore, the second output signal OUT2 output by the output unit 310 is at a high level at time t1.

At time t2, the first output signal OUT1 changes from a high level to a low level, the N-MOS transistor N21 is turned off, and the P-MOS transistor P24 is turned on. The bias current I' flows to the capacitor C3 and the capacitor C3 is charged. The voltage $V_2$ (the voltage at the capacitor C3) at the node E5 increases from a low level (from the initial voltage $V_{IN}$, e.g., 0V). Because the amount of the bias current I' is small, the voltage $V_2$ rises slowly. When the voltage $V_2$ is less than the preset voltage value $V_{SET}$, the P-MOS transistor P23 in the output unit 310 is turned on and the voltage $V_3$ at the node E6 is at a high level. Therefore, the second output signal OUT2 output by the output unit 310 is at a high level at time t2.

At time t2+t, when the voltage $V_2$ is not less than the preset voltage value $V_{SET}$, the P-MOS transistor P23 in the output unit 310 is turned off and the voltage $V_3$ at the node E6 is pulled down; that is, the voltage $V_3$ decreases to a low level. Therefore, the second output signal OUT2 output by the output unit 310 is at a low level at time t2+t.

As can be seen from FIG. 4, when the first output signal OUT1 is changed from a high level to a low level, the delay unit 212 delays, by the preset time period t, transmitting a low level in the first output signal OUT1 before generating the second output signal OUT2. In this embodiment, the initial voltage $V_{IN}$ at the capacitor C3 is 0V, the preset voltage value $V_{SET}=V_{total}-V_{gs}$, the charging current of the capacitor C3 is the bias current $I'=(V_{total}-V_{gs})/R_1$, and according to the principle of equal charges on the capacitor C3, $t\times(V_{total}-V_{gs})/R_1=(V_{total}-V_{gs})\times C_3$. The preset time period t required for the voltage at the capacitor C3 to increase from 0V to $V_{SET}$ is $R_1\times C_3$; that is, $t=R_1\times C_3$, where $C_3$ represents the capacitance value of the capacitor C3, $R_1$ represents the resistance value of the resistor R1, $V_{total}$ represents the voltage value of the voltage signal VDD, and $V_{gs}$ represents the voltage difference between the gate and the source of the P-MOS transistor P23. The length of the preset time period t is determined by the resistance value $R_1$ of the resistor R1 and by the capacitance value $C_3$ of the capacitor C3 that are specific to the controller 140. That is, the preset time period t can be determined specifically for the controller 140 based on its actual characteristics, which guarantees the accuracy of the internal timing of the controller 140, thereby improving the accuracy of the configuration signal.

Figure 5:
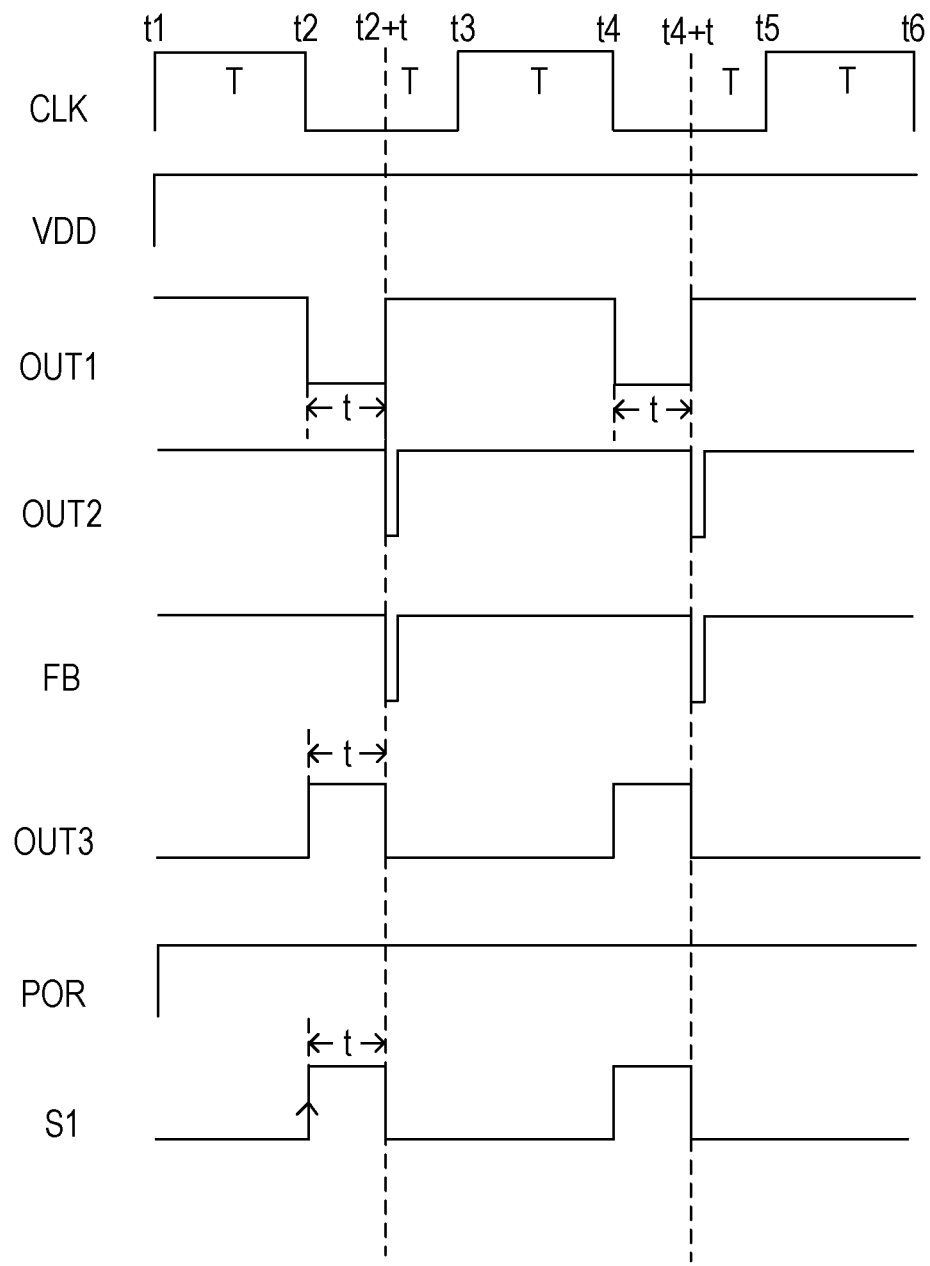
FIG. 5 shows a diagram illustrating operation of a controller, in accordance with embodiments of the present invention.

FIG. 5 shows a diagram 500 illustrating operation of the controller 140, in accordance with embodiments of the present invention. FIG. 5 is described in conjunction with FIG. 1 and FIG. 2. FIG. 5 shows the states of the clock signal CLK, the voltage signal VDD, the first output signal OUT1, the second output signal OUT2, the feedback signal FB, the third output signal OUT3, the reference signal POR, and the indication signal S1. In the example of FIG. 5, after the controller 140 is powered on, the voltage signal VDD is at a high level and the reference signal POR is at a high level.

At time t1, the external device 130 transmits the clock signal CLK. The clock signal CLK is a pulse signal with an equal time interval T. At time t1, because the clock signal CLK is at a high level, the first logic circuit 211 transmits a high level in the voltage signal VDD and generates the first output signal OUT1 in a high-level state. The delay unit 212 transmits a high level in the first output signal OUT1 and generates the second output signal OUT2 in a high-level state. The second logic circuit 213 performs an AND operation on the second output signal OUT2 in the high-level state and the reference signal POR, and outputs the feedback signal FB in the high-level state. The first logic circuit 211 receives the feedback signal FB in a high-level state and outputs the first output signal OUT1 in a high-level state. The third logic circuit 214 performs a NOT operation on the first output signal OUT1 in a high-level state and outputs the third output signal OUT3 in a low-level state. The fourth logic circuit 215 performs an AND operation on the reference signal POR, the second output signal OUT2 in a high-level state, and the third output signal OUT3 in a low-level state, and outputs the indication signal S1 in a low-level state.

At time t2, the first logic circuit 211 receives the clock signal CLK changed from a high level to a low level, does not transfer a high level in the voltage signal VDD and generates the first output signal OUT1 in a low-level state. The delay unit 212 receives the first output signal OUT1 in a low-level state, does not transfer a low level in the first output signal OUT1 and generates the second output signal OUT2 in a high-level state. That is, at time t2, the delay unit 212 continues to output the second output signal OUT2 in a high-level state. The second logic circuit 213 performs an AND operation on the second output signal OUT2 that is in a high-level state and the reference signal POR, and outputs the feedback signal FB in a high-level state. The first logic circuit 211 receives the feedback signal FB in a high-level state and outputs the first output signal OUT1 in a low-level state. The third logic circuit 214 performs a NOT operation on the first output signal OUT1 in a low-level state and changes the third output signal OUT3 from a low level to a high level. The fourth logic circuit 215 performs an AND operation on the reference signal POR, the second output signal OUT2 in a high-level state, and the third output signal OUT3 in a high-level state, and outputs the indication signal S1 in a high-level state.

At time t2+t, the delay unit 212 transmits a low level in the first output signal OUT1 and generates the second output signal OUT2 in a low-level state. The second logic circuit 213 performs an AND operation on the second output signal OUT2 that is in a low-level state and the reference signal POR, and changes the feedback signal FB from a high level to a low level. The first logic circuit 211 receives the feedback signal FB in a low-level state and changes the first output signal OUT1 from a low level to a high level. The third logic circuit 214 performs a NOT operation on the first output signal OUT1 in a high-level state and changes the third output signal OUT3 from a high level to a low level. The fourth logic circuit 215 performs an AND operation on the reference signal POR, the second output signal OUT2 in a low-level state, and the third output signal OUT3 in a low-level state, and changes the indication signal S1 from a high level to a low level. The high level in the indication signal S1 lasts for the preset time period t.

At time t3 and time t5, the operation mode selected by the system 100 is the same as that at time t1. At time t4 and time t6, the operation mode selected by the system 100 is the same as that at time t2. At time t4+t, the operation mode selected by the system 100 is the same as that at time t2+t. As can be seen from FIG. 5, the indication signal S1 is at a high level at time t2 to t2+t and at time t4 to t4+t, and the indication signal S1 is at a low level at time t2+t to t4 and at time t4+t to t6. The indication signal S1 is a rectangular wave signal composed of periodic alternating high and low levels. The generation of high and low levels in the indication signal S1 can be accurately determined, which ensures the accuracy of the internal timing of the controller 140, and enables the controller 140 to more accurately provide the configuration signal. In addition, when the indication signal S1 is changed from a low level to a high level, the feedback unit 220 sends one value in the configuration signal to the external device 130 to enable the external device 130 to identify the type of the charging cable 120.

Figure 6:
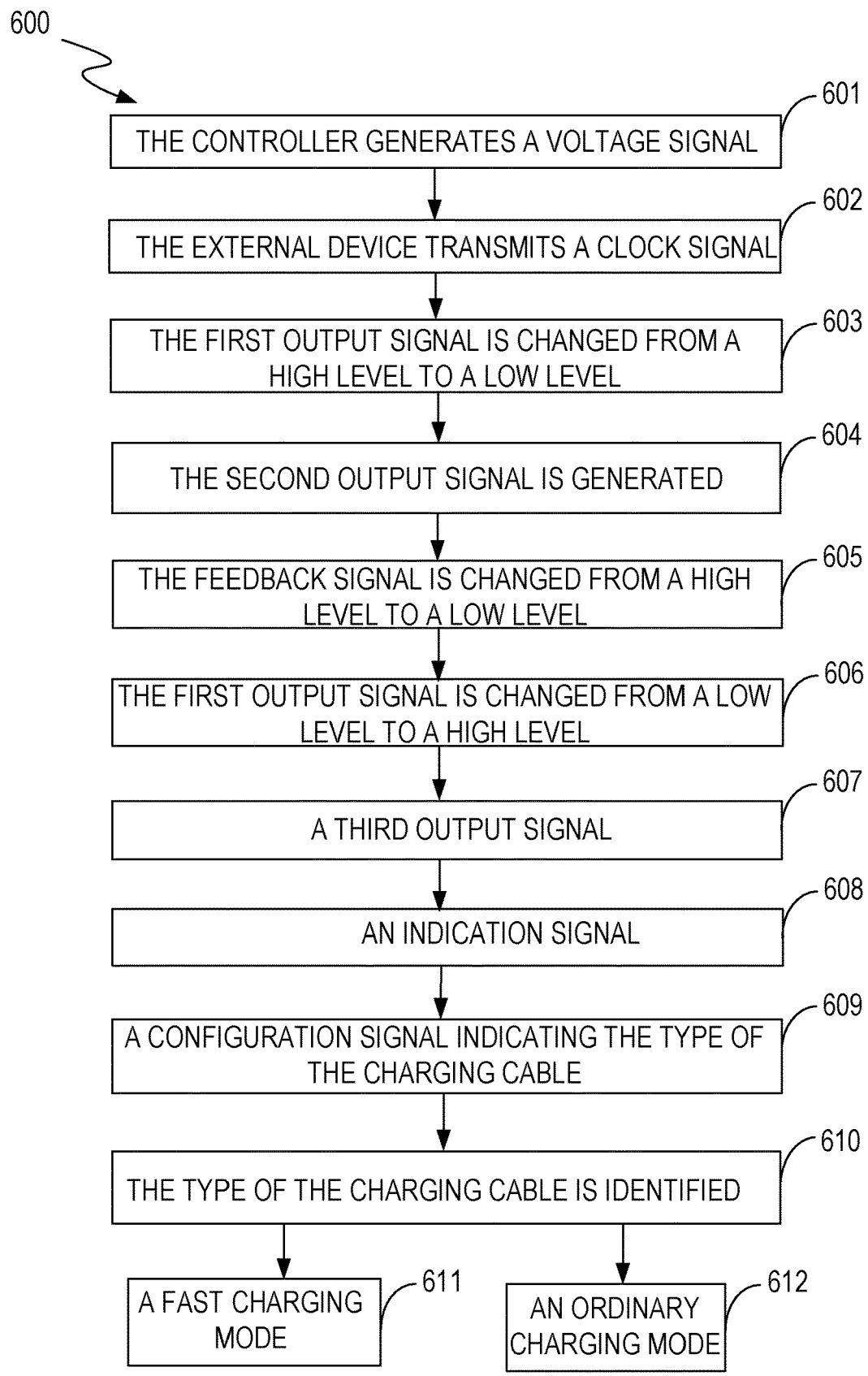
FIG. 6 shows a flowchart of a method for identifying a type of a charging cable, in accordance with embodiments of the present invention.

FIG. 6 shows a flowchart 600 of a method for identifying the type of a charging cable 120, in accordance with embodiments of the present invention. FIG. 6 is described in conjunction with FIG. 1 and FIG. 2.

In step 601, after the system 100 for identifying the charging cable 120 is powered on, the controller 140 generates a voltage signal VDD in a high-level state.

In step 602, the external device 130 transmits a clock signal CLK to the controller 140.

In step 603, the first logic circuit 211 receives the voltage signal VDD, and changes a first output signal OUT1 from a high level to a low level when the clock signal CLK is changed from a high level to a low level.

In step 604, when the first output signal OUT1 is changed from a high level to a low level, the delay unit 212 delays, by a preset time period t, transmitting a low level in the first output signal OUT1 to generate a second output signal OUT2.

In step 605, when the second output signal OUT2 is changed from a high level to a low level, the second logic circuit 213 changes a feedback signal FB from a high level to a low level, where the feedback signal FB is generated by the second logic circuit 213.

In step 606, when the feedback signal FB is changed from a high level to a low level, the first logic circuit 211 changes the first output signal OUT1 from a low level to a high level. As such, a low level in the first output signal OUT1 lasts for the preset time period t.

In step 607, the third logic circuit 214 performs a NOT operation on the first output signal OUT1 and outputs a third output signal OUT3.

In step 608, the fourth logic circuit 215 performs an AND operation on the second output signal OUT2, the third output signal OUT3, and a reference signal POR, and generates an indication signal S1. During the preset time period t, the reference signal POR, the second output signal OUT2, and the third output signal OUT3 are all at a high level, so the indication signal S1 is also at a high level.

In step 609, the feedback unit 220 sends a configuration signal indicating the type of the charging cable 120, when the indication signal S1 is changed from a low level to a high level.

In step 610, the external device 130 identifies the type of the charging cable 120 according to the configuration signal.

In step 611, when the type of the charging cable 120 is a first type, the external device 130 charges the terminal 110 in a fast charging mode.

In step 612, when the type of the charging cable 120 is a second type, the external device 130 charges the terminal 110 in an ordinary charging mode.

Figure 7:
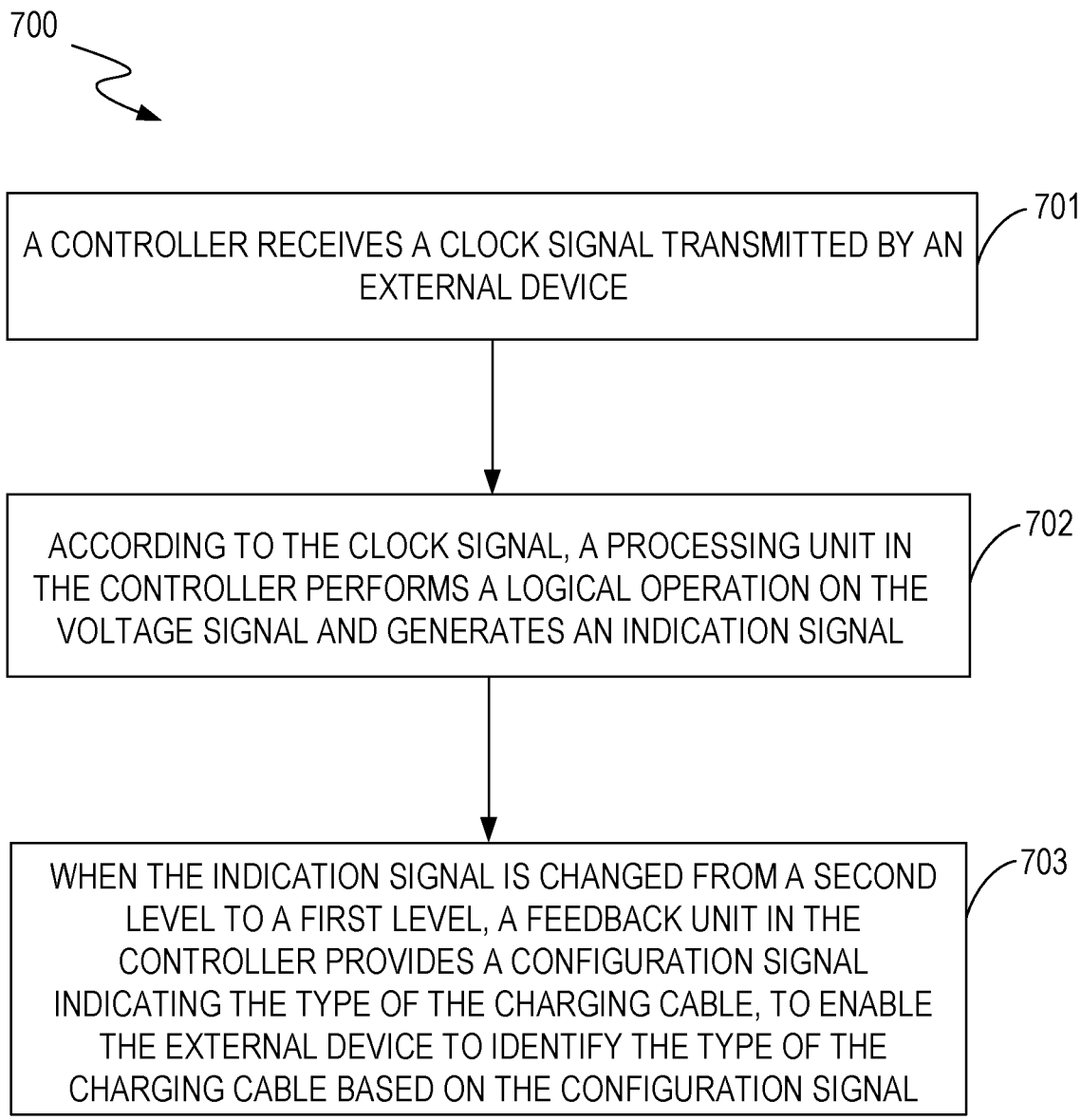
FIG. 7 shows a flowchart of a method for identifying a type of a charging cable, in accordance with embodiments of the present invention.

FIG. 7 shows a flowchart 700 of a method for identifying a type of a charging cable 120, in accordance with embodiments of the present invention. FIG. 7 is described in conjunction with FIG. 1 and FIG. 2.

In step 701, a controller 140 receives a clock signal CLK transmitted by an external device 130.

In step 702, according to the clock signal CLK, a processing unit 210 in the controller 140 performs a logical operation on the voltage signal VDD and generates an indication signal S1, where the voltage signal VDD is generated by the controller 140. The indication signal S1 includes a rectangular wave signal having a first level (e.g., a high level) and a second level (e.g., a low level).

In step 703, when the indication signal S1 is changed from a second level (e.g., a low level) to a first level (e.g., a high level), a feedback unit 220 in the controller 140 provides a configuration signal indicating the type of the charging cable 120, to enable the external device 130 to identify the type of the charging cable 120 based on the configuration signal.

While the foregoing description and drawings represent embodiments of the present invention, it will be understood that various additions, modifications, and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for a charging cable, comprising:
   a transmission terminal, operable for transmitting a clock signal transmitted by an external device, and also operable for receiving electric power supplied by a power source to enable said controller to generate a voltage signal;
   a processing unit, coupled to said transmission terminal, operable for performing a logical operation on said voltage signal and generating an indication signal based on said clock signal, wherein said indication signal comprises a rectangular wave signal having a first level and a second level; and
   a feedback unit, coupled to said processing unit, operable for providing a configuration signal indicating a type of said charging cable when said indication signal is changed from said second level to said first level;
   wherein said transmission terminal is operable for transmitting said configuration signal to said external device, to enable said external device to identify said type of said charging cable based on said configuration signal.

2. The controller of claim 1, wherein said processing unit comprises:
   a first logic circuit, coupled to said transmission terminal, operable for generating a first output signal;
   a delay unit, coupled to said first logic circuit, operable for generating a second output signal based on said first output signal;
   a second logic circuit, coupled to said delay unit and said first logic circuit, operable for generating a feedback signal based on said second output signal;
   a third logic circuit, coupled to said first logic circuit, operable for generating a third output signal based on said first output signal; and
   a fourth logic unit, coupled to said delay unit and said second logic circuit, operable for performing an AND operation on said second output signal and said third output signal, and also operable for generating said indication signal;
   wherein said first logic circuit receives said clock signal, said voltage signal, and said feedback signal, and wherein said first logic circuit changes said first output signal from a first level to a second level when said clock signal is changed from a first level to a second level,
   wherein said delay unit delays, by a preset time period, transmitting said second level in said first output signal to generate said second output signal, when said first output signal is changed from said first level to said second level,
   wherein said second logic circuit changes said feedback signal from a first level to a second level when said second output signal is changed from a first level to a second level, wherein, when said feedback signal is changed from said first level to said second level, said first logic circuit changes said first output signal from said second level to said first level, wherein said second level in said first output signal lasts for said preset time period, and wherein said third logic circuit inverts said first output signal and generates said third output signal.

3. The controller of claim 2, wherein said delay unit comprises:
 a first metal-oxide semiconductor (MOS) transistor, coupled to a supply unit, operable for mirroring a bias current generated by said supply unit;
 a second MOS transistor, coupled to said first MOS transistor and said first logic circuit, wherein when said first output signal is at said second level, said second MOS transistor is turned on and said bias current flows through said second MOS transistor;
 a third MOS transistor, coupled to said first logic circuit, wherein when said first output signal is at said first level, said third MOS transistor is turned on,
 a capacitor, coupled to said second MOS transistor and said third MOS transistor, wherein said capacitor is charged when said second MOS transistor is turned on and said third MOS transistor is turned off; and wherein said capacitor is discharged when said second MOS transistor is turned off and said third MOS transistor is turned on; and
 an output unit, coupled between said capacitor and said fourth logic circuit, operable for outputting said second output signal based on a voltage at said capacitor.

4. The controller of claim 3, wherein when said first output signal is at said second level, said second MOS transistor is turned on and said third MOS transistor is turned off, and then said capacitor is charged by said bias current; wherein said second output signal is at said first level when said voltage at said capacitor is less than a preset voltage value; wherein said second output signal is at said second level when said voltage at said capacitor is not less than said preset voltage value; and wherein said voltage at said capacitor increases from an initial voltage value to said preset voltage value during said preset time period.

5. The controller of claim 3, wherein when said first output signal is at said first level, said second MOS transistor is turned off and said third MOS transistor is turned on, and then said capacitor is discharged; wherein said second output signal is at said first level when said voltage at said capacitor is less than a preset voltage value.

6. The controller of claim 3, wherein said supply unit comprises a resistor, and wherein said preset time period is a product of a capacitance value of said capacitor and a resistance value of said resistor.

7. A charging cable, comprising:
 a controller, operable for two-way communication with an external device to enable said external device to identify a type of said charging cable;
 wherein said controller comprises:
 a transmission terminal, coupled to said external device, operable for transmitting a clock signal transmitted by said external device, and also operable for receiving electric power supplied by a power source to enable said controller to generate a voltage signal;
 a processing unit, coupled to said transmission terminal, operable for performing a logical operation on said voltage signal and for generating an indication signal based on said clock signal, wherein said indication signal comprises a rectangular wave signal having a first level and a second level; and a feedback unit, coupled to said processing unit, operable for providing a configuration signal indicating said type of said charging cable when said indication signal is changed from said second level to said first level;
 wherein said transmission terminal is operable for transmitting said configuration signal to said external device, to enable said external device to identify said type of said charging cable based on said configuration signal.

8. The charging cable of claim 7, wherein said processing unit comprises:
 a first logic circuit, coupled to said transmission terminal, operable for generating a first output signal;
 a delay unit, coupled to said first logic circuit, operable for generating a second output signal based on said first output signal;
 a second logic circuit, coupled to said delay unit and said first logic circuit, operable for generating a feedback signal based on said second output signal;
 a third logic circuit, coupled to said first logic circuit, operable for generating a third output signal based on said first output signal; and
 a fourth logic unit, coupled to said delay unit and said second logic circuit, operable for performing an AND operation on said second output signal and said third output signal, and also operable for generating said indication signal;
 wherein said first logic circuit receives said clock signal, said voltage signal, and said feedback signal, wherein said first logic circuit changes said first output signal from a first level to a second level when said clock signal is changed from a first level to a second level,
 wherein said delay unit delays, by a preset time period, transmitting said second level in said first output signal to generate said second output signal, when said first output signal is changed from said first level to said second level,
 wherein said second logic circuit changes said feedback signal from a first level to a second level when said second output signal is changed from a first level to a second level,
 wherein, when said feedback signal is changed from said first level to said second level, said first logic circuit changes said first output signal from said second level to said first level, wherein said second level in said first output signal lasts for said preset time period, and
 wherein said third logic circuit inverts said first output signal and generates said third output signal.

9. The charging cable of claim 8, wherein said delay unit comprises:
 a first metal-oxide semiconductor (MOS) transistor, coupled to a supply unit, operable for mirroring a bias current generated by said supply unit;
 a second MOS transistor, coupled to said first MOS transistor and said first logic circuit, wherein when said first output signal is at said second level, said second MOS transistor is turned on and said bias current flows through said second MOS transistor;
 a third MOS transistor, coupled to said first logic circuit, wherein when said first output signal is at said first level, said third MOS transistor is turned on,
 a capacitor, coupled to said second MOS transistor and said third MOS transistor, wherein said capacitor is charged when said second MOS transistor is turned on and said third MOS transistor is turned off; and wherein said capacitor is discharged when said second MOS transistor is turned off and said third MOS transistor is turned on; and an output unit, coupled between said capacitor and said fourth logic circuit, operable for outputting said second output signal based on a voltage at said capacitor.

10. The charging cable of claim 9, wherein when said first output signal is at said second level, said second MOS transistor is turned on and said third MOS transistor is turned off, and then said capacitor is charged by said bias current; wherein said second output signal is at said first level when said voltage at said capacitor is less than a preset voltage value; wherein said second output signal is at said second level when said voltage at said capacitor is not less than said preset voltage value; and wherein said voltage at said capacitor increases from an initial voltage value to said preset voltage value during said preset time period.

11. The charging cable of claim 9, wherein when said first output signal is at said first level, said second MOS transistor is turned off and said third MOS transistor is turned on, and then said capacitor is discharged; and wherein said second output signal is at said first level when said voltage at said capacitor is less than a preset voltage value.

12. The charging cable of claim 9, wherein said supply unit comprises a resistor, and wherein said preset time period is a product of a capacitance value of said capacitor and a resistance value of said resistor.

13. A system for identifying a type of a charging cable, said system comprising:

a charging cable, configured to generate a configuration signal indicating a type of said charging cable;

an external device, operable for two-way communication with said charging cable, for identifying a type of said charging cable based on said configuration signal, and for determining a charging mode of a terminal based on said type of said charging cable;

wherein said charging cable comprises:

a controller, coupled to said external device, operable for two-way communication with said external device to enable said external device to identify said type of said charging cable;

wherein said controller comprises:

a transmission terminal, coupled to said external device, operable for transmitting a clock signal transmitted by said external device, and also operable for receiving electric power supplied by a power source to enable said controller to generate a voltage signal;

a processing unit, coupled to said transmission terminal, operable for performing a logical operation on said voltage signal and for generating an indication signal based on said clock signal, wherein said indication signal comprises a rectangular wave signal having a first level and a second level; and a feedback unit, coupled to said processing unit, operable for providing a configuration signal indicating said type of said charging cable when said indication signal is changed from said second level to said first level;

wherein said transmission terminal is operable for transmitting said configuration signal to said external device, to enable said external device to identify said type of said charging cable based on said configuration signal.

14. The system of claim 13, wherein said processing unit comprises:

a first logic circuit, coupled to said transmission terminal, operable for generating a first output signal;

a delay unit, coupled to said first logic circuit, operable for generating a second output signal based on said first output signal;

a second logic circuit, coupled to said delay unit and said first logic circuit, operable for generating a feedback signal based on said second output signal;

a third logic circuit, coupled to said first logic circuit, operable for generating a third output signal based on said first output signal; and a fourth logic unit, coupled to said delay unit and said second logic circuit, operable for performing an AND operation on said second output signal and said third output signal, and also operable for generating said indication signal;

wherein said first logic circuit receives said clock signal, said voltage signal, and said feedback signal, wherein said first logic circuit changes said first output signal from a first level to a second level when said clock signal is changed from a first level to a second level, wherein said delay unit delays, by a preset time period, transmitting said second level in said first output signal to generate said second output signal, when said first output signal is changed from said first level to said second level, wherein said second logic circuit changes said feedback signal from a first level to a second level when said second output signal is changed from a first level to a second level, wherein, when said feedback signal is changed from said first level to said second level, said first logic circuit changes said first output signal from said second level to said first level, wherein said second level in said first output signal lasts for said preset time period, and wherein said third logic circuit inverts said first output signal and generates said third output signal.

15. The system of claim 14, wherein said delay unit comprises:

a first metal-oxide semiconductor (MOS) transistor, coupled to a supply unit, operable for mirroring a bias current generated by said supply unit;

a second MOS transistor, coupled to said first MOS transistor and said first logic circuit, wherein when said first output signal is at said second level, said second MOS transistor is turned on and said bias current flows through said second MOS transistor;

a third MOS transistor, coupled to said first logic circuit, wherein when said first output signal is at said first level, said third MOS transistor is turned on, a capacitor, coupled to said second MOS transistor and said third MOS transistor, wherein said capacitor is charged when said second MOS transistor is turned on and said third MOS transistor is turned off; and wherein said capacitor is discharged when said second MOS transistor is turned off and said third MOS transistor is turned on; and an output unit, coupled between said capacitor and said fourth logic circuit, operable for outputting said second output signal based on a voltage at said capacitor.

16. The system of claim 15, wherein when said first output signal is at said second level, said second MOS transistor is turned on and said third MOS transistor is turned off, and then said capacitor is charged by said bias current; wherein said second output signal is at said first level when said voltage at said capacitor is less than a preset voltage value; wherein said second output signal is at said second level when said voltage at said capacitor is not less than said preset voltage value; and wherein said voltage at said capacitor increases from an initial voltage value to said preset voltage value during said preset time period.

17. The system of claim 15, wherein when said first output signal is at said first level, said second MOS transistor is turned off and said third MOS transistor is turned on, and then said capacitor is discharged; and wherein said second output signal is at said first level when said voltage at said capacitor is less than a preset voltage value.

18. The system of claim 15, wherein said supply unit comprises a resistor, and wherein said preset time period is a product of a capacitance value of said capacitor and a resistance value of said resistor.

19. The system of claim 13, wherein said configuration signal comprises a first signal and a second signal, and wherein said external device compares said first signal and said second signal to identify said type of said charging cable.

20. The system of claim 13, wherein said configuration signal comprises a first signal, and wherein said external device compares said first signal and a preset signal to identify said type of said charging cable, wherein said preset signal is stored in said external device.

21. A method for identifying a type of a charging cable, said method comprising:
receiving, using a controller, a clock signal transmitted by an external device;
performing, using a processing unit in said controller, a logical operation on a voltage signal and generating an indication signal based on said clock signal, wherein said indication signal comprises a rectangular wave signal having a first level and a second level, and wherein said voltage signal is generated by said controller; and
providing, using a feedback unit in said controller, a configuration signal indicating said type of said charging cable, to enable said external device to identify said type of said charging cable based on said configuration signal, when said indication signal is changed from said second level to said first level.

22. The method of claim 21, wherein said performing said logical operation on said voltage signal and said generating said indication signal based on said clock signal comprises:
changing, using a first logic circuit, a first output signal from a first level to a second level, when said clock signal is changed from a first level to a second level;
using a delay unit, delaying, by a preset time period, transmitting said second level in said first output signal to generate said second output signal, when said first output signal is changed from said first level to said second level;
changing, using a second logic circuit, a feedback signal from a first level to a second level, when said second output signal is changed from a first level to a second level, wherein said feedback signal is generated by said second logic circuit;
changing, using said first logic circuit, said first output signal from said second level to said first level, when said feedback signal is changed from said first level to said second level, wherein said second level in said first output signal lasts for said preset time period;
inverting, using a third logic circuit, said first output signal and generating a third output signal; and
performing, using a fourth logic circuit, an AND operation on said second output signal and said third output signal, and generating said indication signal.

23. The method of claim 22, wherein said delaying a preset time period to transmit said second level in said first output signal to generate said second output signal, when said first output signal is changed from said first level to said second level comprises:
mirroring, using a first metal-oxide semiconductor (MOS) transistor, a bias current generated by said supply unit;
turning on a second MOS transistor and turning off a third MOS transistor, and then charging a capacitor through said bias current, when said first output signal is at said second level; and
outputting, using an output unit, said second output signal based on a voltage at said capacitor.

24. The method of claim 23, wherein said second output signal is at said first level when said voltage at said capacitor is less than a preset voltage value; wherein said second output signal is at said second level when said voltage at said capacitor is not less than said preset voltage value, and wherein said voltage at said capacitor increases from an initial voltage value to said preset voltage value during said preset time period.

25. The method of claim 23, wherein said supply unit comprises a resistor, and wherein said preset time period is a product of a capacitance value of said capacitor and a resistance value of said resistor.

26. The method of claim 22, wherein said delaying a preset time period to transmit said second level in said first output signal to generate said second output signal, when said first output signal is changed from said first level to said second level comprises:
turning off a second metal-oxide semiconductor (MOS) transistor and turning on a third MOS transistor, and then discharging a capacitor, when said first output signal is at said first level; and
outputting, using an output unit, said second output signal having said first level based on a voltage at said capacitor.

* * * * *